United States Patent

Tao

[15] 3,665,042
[45] May 23, 1972

[54] PROCESS FOR 4-ALKYL-2,6-DINITROCHLOROBENZENES

[72] Inventor: Eddie V. P. Tao, Indianapolis, Ind.

[73] Assignee: Eli Lilly and Company, Indianapolis, Ind.

[22] Filed: May 22, 1970

[21] Appl. No.: 39,876

[52] U.S. Cl. ............................................... 260/646, 71/125
[51] Int. Cl. ............................................................ C07c 79/12
[58] Field of Search ..................................................... 260/646

[56] References Cited

UNITED STATES PATENTS 3,005,031   10/1961   Friedrich ................................ 260/646

Primary Examiner—Leland A. Sebastian
Attorney—Everet F. Smith and Walter E. Buting

[57] ABSTRACT

4-Isopropyl-2,6-dinitrochlorobenzene and 4-tert-butyl-2,6-dinitrochlorobenzene are prepared in high yields via chlorination of the corresponding 2,6-dinitro phenols with thionyl chloride in the presence of dimethylformamide and a $C_6$-$C_{10}$ alkyl hydrocarbon solvent. The 4-alkyl-2,6-dinitrochlorobenzenes obtained thereby are useful intermediates of the herbicidally active dinitroanilines.

3 Claims, No Drawings

PROCESS FOR 4-ALKYL-2,6-DINITROCHLOROBENZENES

BACKGROUND OF THE INVENTION

4-Alkyl-2,6-dinitrochlorobenzenes are useful intermediates for the preparation of the herbicidally active, 4-alkyl-2,6-dinitroanilines as described in U. S. Pat. No. 3,257,190. For example, the 4-alkyl-2,6-dinitrochlorobenzene is reacted with the desired secondary alkyl amine in an appropriate solvent to yield the desired aniline.

The 4-alkyl-2,6-dinitrochlorobenzenes are prepared from the corresponding dinitro phenols by chlorination, the phenolic hydroxyl group being replaced by the chloro substituent. One presently known method for converting a 4-alkyl-2,6-dinitrophenol to the corresponding 4alkyl-2,6dinitrochlorobenzene comprises the reaction of the phenol with thionyl chloride in the presence of dimethylformamide as described in the J. Pharm. Soc. Japan, 85, 544 (1965). Although generally a satisfactory method for preparing 4-nitro and 4-halo substituted compounds, the method as presently practiced for the preparation of 4-isopropyl-2,6dinitrochlorobenzene and 4-tert-butyl-2,6-dinitrochlorobenzene affords these products contaminated with substantial amounts of unreacted phenol. Consequently the reaction products require recrystallization to insure sufficient purity for subsequent reactions. As presently practiced, the thionyl chloride-DMF chlorination reaction is carried out in solvents such as benzene, toluene, carbon tetrachloride and ethylene dichloride in which the reaction product and unreacted phenol are substantially soluble. Evaporation of the solvent and recrystallization of the reaction product mixture is necessary to obtain the chlorinated products 4-isopropyl- and 4-tert-butyl-2,6-dinitrochlorobenzene in the desired state of purity. From the standpoint of a large scale manufacturing process, the evaporation and recrystallization steps required to isolate these two chemical intermediates are disadvantageous and costly. Consequently, there is a need for an improved method for preparing the 4-isopropyl and 4-tertbutyl-2,6-dinitrochlorobenzenes from the corresponding phenols which is amenable to a less costly isolation procedure. It is an object of this invention to provide improved process conditions for the chlorination of 4-isopropyl- and 4-tert-butyl-2,6-dinitrophenol which afford the corresponding 4-isopropyl-2,6dinitrochlorobenzene and 4-tert-butyl-2,6-dinitrochlorobenzene directly from the chlorination reaction mixture in high yields and in a highly pure state.

SUMMARY

According to the practice of this invention a 4-alkyl-2,6-dinitrophenol represented by the formula

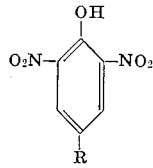

wherein R is iso-propyl or tert-butyl, is reacted with thionyl chloride in the presence of dimethylformamide (DMF) and a $C_6$ to $C_{10}$ alkyl hydrocarbon solvent to yield a 4-alkyl-2,6-dinitro-chlorobenzene represented by the formula

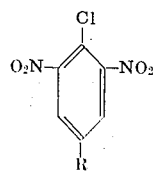

wherein R has the same meanings as previously defined. The chlorination reaction is carried out at a temperature between about 65° C. and 95° C. for about 5 to 7 hours. The reaction mixture is cooled to room temperature and a 5 percent aqueous solution of sodium bicarbonate is added with stirring. The reaction product which precipitates is filtered and washed with water and alkyl hydrocarbon solvent to yield the crystalline 4-alkyl-2,6-dinitrochlorobenzene essentially uncontaminated with unreacted 4-alkyl-2,6-dinitrophenol.

DETAILED DESCRIPTION

The process improvements described herein for the manufacture of 4-isopropyl- and 4-tert-butyl-2,6-dinitrochlorobenzene via the thionyl chloride-DMF chlorination of the corresponding 2,6-dinitrophenol comprise the use of a $C_6$–$C_{10}$ alkyl hydrocarbon solvent.

The 4-isopropyl- or 4-tert-butyl-2,6-dinitrophenol is chlorinated with thionyl chloride in the presence of a catalytic amount of DMF at a temperature between about 65° and 95° C. The chlorination reaction is carried out in an inert hydrocarbon solvent selected from among the $C_6$–$C_{10}$ alkyl hydrocarbons such as hexane, heptane, octane, isooctane, nonane, decane and the like. The preferred alkyl hydrocarbon solvent of this invention is n-hexane.

The ratio of 4-alkyl-2,6-dinitrophenol to alkyl hydrocarbon solvent employed may vary somewhat; however it is preferable to use a ratio of about 1 g. of phenol to about 1 ml. or less of alkyl hydrocarbon solvent. When the above specified ratio is employed the reaction is generally completed in about 5 to 7 hours. When more solvent is used, the reaction time increases with increased dilution.

The chlorinating agent, thionyl chloride, is employed in excess with respect to the dinitrophenol. A molar excess of between about 25 percent to about 45 percent can be employed, the preferred molar excess being about 40 percent.

Other chlorinating agents such as phosphorus oxychloride, phosphorus pentachloride and phosgene can be employed in the present process; however, thionyl chloride is the much preferred chlorinating agent. The phosphorus chlorides present purification problems and phosgene gas has undesirable toxic properties, whereas the liquid thionyl chloride is conveniently handled and its reaction products, hydrogen chloride and sulfur dioxide, escape from the reaction mixture.

As previously mentioned, the chlorination reaction with thionyl chloride is carried out in the presence of a catalytic amount of DMF. The term "catalytic amount" refers to an amount of DMF corresponding to a ratio of DMF to 4-alkyl-2,6-dinitrophenol of between about 10 ml. of DMF per mole of dinitrophenol to about 40 ml. of DMF per mole of dinitropheno. The preferred ratio is 20 ml. of DMF per mole of 4-alkyl-2,6-dinitrophenol. When amounts of DMF in excess of the catalytic amount are employed, the solubility of the reaction product, a 4-alkyl-2,6-dinitrochlorobenzene in the chlorination reaction mixture is increased and thereby results in more difficult isolation.

Generally the chlorination reaction is performed by adding the 4-isopropyl- or 4-t-butyl-2,6-dinitrophenol to a reaction vessel containing the desired amounts of the alkyl hydrocarbon solvent and DMF. The mixture is heated to the reaction temperature and thionyl chloride is slowly added by dropwise addition. The reaction mixture is maintained at the reaction temperature for about 5 to 7 hours and is then allowed to cool slowly to room temperature. Generally, when R in the above formula represents tert-butyl, the reaction product 4-tert-butyl-2,6-dinitrochlorobenzene precipitates from the reaction mixture above room temperature as the mixture is cooling. When R in the above formula represents isopropyl, the reaction product, 4-isopropyl-2,6-dinitrochlorobenzene forms a crystalline precipitate as the reaction mixture is cooled to a temperature of about 10° C. Frequently, however, the reaction products precipitate as oils from the chlorination mixture on cooling. According to the practice of this invention, it is preferable to add to the reaction mixture on cooling an aqueous 5 percent solution of sodium bicarbonate in an amount sufficient to react with any excess thionyl chloride or free hydrogen chloride. The crystallization of the reaction products is thereby enhanced.

The reaction products of the present improved process, 4-isopropyl-2,6-dinitrochlorobenzene or 4-tert-butyl-2,6-dinitrochlorobenzene, thus obtained as crystalline precipitates are essentially free of unreacted 4-alkyl-2,6-dinitrophenol, the predominant contaminant. The chlorobenzene intermediates provided by the improved process described herein are obtained in yields of greater than 90 percent and commonly contain only 1 percent or less of the unreacted 4-alkyl-2,6-dinitrophenol as determined by U.V. spectrophotometry. The products can be used without further purification in the synthesis of the herbicidally active N,N-di-n-propyl-4-isopropyl-2,6dinitroaniline as described in U. S. Pat. No. 3,257,190 and N,N-di-n-propyl-4-t-butyl-2,6-dinitroaniline as described in British Pat. No. 917,253.

As previously noted, a conventional method for converting a 4-alkyl-2,6-dinitrophenol to a 4-alkyl-2,6-dinitrochlorobenzene makes use of inert reaction solvents such as benzene, toluene, carbon tetrachloride, chloroform and ethylene dichloride. Whereas the use of one of these solvents in the thionyl chloride-DMF chlorination reaction affords acceptable product yields, the 4-isopropyl- or 4-t-butyl-2,6-dinitrochlorobenzenes do not precipitate from the reaction medium and therefore require isolation and purification to achieve satisfactory purity. By employing the improved process of the present invention comprising the use of a $C_6$ to $C_{10}$ alkyl hydrocarbon solvent, and preferably comprising the use of an n-hexane, the 4-isopropyl- or 4-t-butyl-2,6-dinitrochlorobenzenes are obtained in excellent purity and yield directly from the chlorination reaction mixture.

The following Examples more fully illustrate the improved process of the present invention.

EXAMPLE 1

4-Isopropyl-2,6-dinitrochlorobenzene

To a suspension of 452 g. (2 moles) of 4-isopropyl-2,6-dinitrophenol in 400 ml. of n-hexane was added 40 ml. of dimethylformamide. The mixture was heated to a temperature between 40°–50° C., and 333 g. (2.8 moles) of thionyl chloride was added dropwise. Following addition of the thionyl chloride the reaction mixture was refluxed for 5 hours and cooled to room temperature. To the cooled reaction mixture was added 125 ml. of a 5 percent solution of sodium bicarbonate and the reaction was stirred for 30 minutes. The crystalline reaction product was filtered and washed with water and hexane and was air dried to afford 456 g. (93 percent yield) of 4-isopropyl-2,6-dinitrochlorobenzene melting at about 61.5°–64° C.

EXAMPLE 2

4-tert-Butyl-2,6-dinitrochlorobenzene

To a suspension of 24 g. (0.1 mole) of 4-tert-butyl-2,6-dinitrophenol in 20 ml. of hexane were added 2 ml. of dimethylformamide and the mixture was warmed to about 50° C. To the warm mixture was added dropwise 16.6 g. (0.14 mole) of thionyl chloride and following addition the reaction mixture was heated at the reflux temperature for 5 hours. The reaction mixture was then cooled to room temperature and 7 ml. of a 5 percent solution of sodium bicarbonate were added with stirring. The crystalline precipitate was filtered and was washed with water and hexane and air dried to yield 24 g. (93 percent yield) of 4-tert-butyl-2,6-dinitrochlorobenzene, melting at about 113°–114.5° C.

I claim:

1. In the process for preparing a 4-alkyl-2,6-dinitrochlorobenzene of the formula

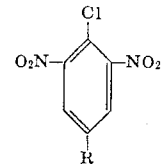

wherein R is isopropyl or tert-butyl, which comprises heating a 4-alkyl-2,6-dinitrophenol with thionyl chloride in the presence of dimethylformamide and an inert solvent, the improvement which comprises conducting the reaction in the presence of 10 to 40 ml. of dimethylformamide and 100 to 500 ml. of a $C_6$-$C_{10}$ alkyl hydrocarbon solvent per mole of 4-alkyl-2,6-dinitrophenol.

2. In the improved process of claim 1, the further improvement which comprises adding a dilute aqueous solution of sodium bicarbonate to the cooled reaction mixture subsequent to the reaction to enhance the crystallization of the product.

3. The improved process of claim 1 wherein the alkyl hydrocarbon solvent is n-hexane.

* * * * *